Figure 1:
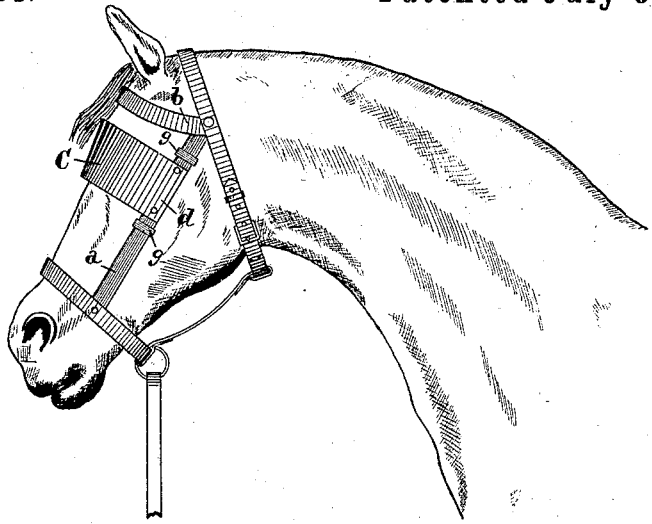

(No Model.)

C. C. COOK.
HALTER.

No. 385,544. Patented July 3, 1888.

WITNESSES:
R. L. Clemmitt
John E. Morris.

INVENTOR:
C. C. Cook

BY Chas B. Mann
ATTORNEY.

United States Patent Office.

CHARLES C. COOK, OF BALTIMORE, MARYLAND.

HALTER.

SPECIFICATION forming part of Letters Patent No. 385,544, dated July 3, 1888.

Application filed May 1, 1888. Serial No. 272,440. (No model.)

*To all whom it may concern:*

Be it known that I, CHARLES C. COOK, a citizen of the United States, residing at Baltimore, in the State of Maryland, have invented certain new and useful Improvements in Halters, of which the following is a specification.

My invention relates to an improved halter for horses, and has for its object to provide a halter with blinds for the animal's eyes, the said blinds to be folded in a compact form and to be confined in position on one of the head-straps, and to be capable of being readily unfolded whenever desired and bound over the animal's eyes.

The invention is illustrated in the drawings, in which—

Figure 2:
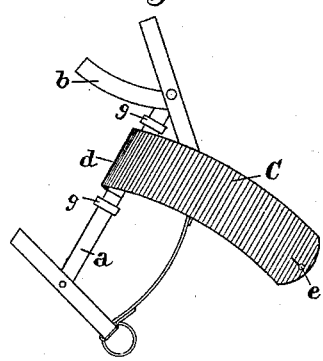
Figure 3:
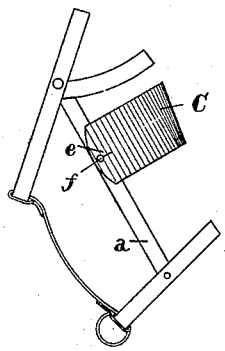
Figure 4:
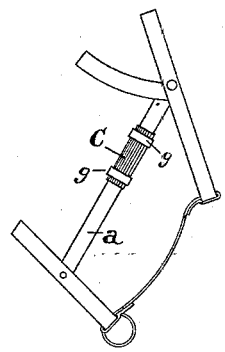
Figure 5:
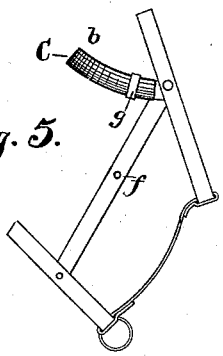

Figure 1 shows the halter on an animal's head, with the blinds stretched over its eyes. Fig. 2 shows the halter with the blind unfolded and unstretched. Fig. 3 shows the opposite side of the halter from that seen in Figs. 1 and 2, and represents the blind in the stretched condition, same as in Fig. 1. Fig. 4 shows the blind folded in the form of a small bundle and confined in contact with the side or jaw strap. Fig. 5 shows the halter with the blind folded and confined in contact with the forehead-strap.

The halter may be constructed in any desired way and of any preferred material.

The letter *a* designates the side or jaw straps; *b*, a strap extending across the forehead. Either or both of these straps may be used, or the one across the forehead may be omitted. The blind C, here shown and described, is to be stretched only when it is desired to blindfold the animal's eyes—as, for instance, in the emergency of the stable being on fire.

The blinds C are shown in the first four figures as attached to the jaw-strap *a*. Each jaw-strap may have a blind, or one blind may be long enough to extend from the jaw-strap on one side entirely across the forehead to the jaw strap on the opposite side. The blind may be made of thin leather, enameled cloth, duck, or any other suitable flexible material. In the present instance the blind C has one end, *d*, attached to one jaw-strap, and the other end is free and has a button-hole, *e*, which takes onto a knob or button, *f*, on the other jaw-strap. The strap to which one end of the blind C is attached has slip-loops *g*. One or two of these slip loops may be used. In the present instance there are two loops. One is above and the other below the blind. The blind, normally, will be folded in a compact form and produce a bundle about the width of a strap. When folded, it will lie close against the strap to which one of its ends is attached, and the slip-loops *g* may be brought around it, as shown in Fig. 4, to confine it.

When it is desired to blindfold the animal's eyes—as in case of the stable being on fire—the slip-loops are to be moved, the blind unfolded and stretched across the animal's eyes, and the free end of the blind made fast to the strap on the opposite side.

My invention covers a flexible eye blind on a halter or other head-gear folded in compact form, and, while folded confined to one of the straps, whereby when not in use it is kept out of the way.

In Fig. 5 the blind C is shown attached to the forehead-strap, where it is represented in a folded condition and confined by slip-loops. In this case the blind when stretched would hang down like a drop curtain, and each lower corner should be fastened to one of the side straps.

It is obvious the blind as here shown may be attached to old halters or halters already made up and ready for use. It is also obvious that a hook or other suitable fastening device may be used on the jaw-strap, instead of the knob or button *f*, to secure the free end of the blind.

Having described my invention, I claim—

1. A halter provided with a blind, C, adapted to be folded in a bundle or stretched across the animal's eyes, and having one end attached to a head-strap, and slip-loops on the strap to which the blind is attached for confining the folded blind, as set forth.

2. A halter provided with a blind, C, adapted to be folded in a bundle or stretched across the animal's eyes, and having one end attached to a jaw-strap, *a*, a slip-loop, *g*, on the said jaw-strap, and a fastening device, *f*, on the other jaw-strap to secure the free end of the blind, as set forth.

In testimony whereof I affix my signature in the presence of two witnesses.

CHARLES C. COOK.

Witnesses:
JOHN E. MORRIS,
JNO. T. MADDOX.